United States Patent [19]

Bruesselbach

[11] Patent Number: 5,208,881
[45] Date of Patent: May 4, 1993

[54] METHOD AND APPARATUS FOR OPTICAL BEAM COMBINATION AND CLEANUP USING STIMULATED SCATTERING

[75] Inventor: Hans W. Bruesselbach, Calabasas, Calif.

[73] Assignee: Hughes Aircraft Company, Los Angeles, Calif.

[21] Appl. No.: 810,980

[22] Filed: Dec. 20, 1991

[51] Int. Cl.⁵ ................................................ G02B 6/26
[52] U.S. Cl. ....................................... 385/27; 385/31; 385/33
[58] Field of Search ........................ 385/27, 28, 31, 33

[56] References Cited

U.S. PATENT DOCUMENTS

| | | | |
|---|---|---|---|
| 4,778,238 | 10/1988 | Hicks | 385/27 |
| 4,807,953 | 2/1989 | Smith et al. | 385/42 |
| 4,922,481 | 5/1990 | Hicks | 385/39 |

OTHER PUBLICATIONS

E. B. Aleksandrov, et al. "Stimulated Raman and Brillouin Scattering in Selective Resonators", Soviet Physics JETP 22, 986–992 (1966).
Serebryakov and Cheertkov, "Wavefront Reversal of Microsecond Radiation in Fiber Waveguides", *Soviet Journal of Quantum Electronics*, vol. 17, 1987, pp. 493–495.
Ippen and Stolen, "Stimulated Brillouin Scattering in Optical Fibers", *Applied Physics Letters*, vol. 21, 1972, pp. 539–541.
Cotter, "Stimulated Brillouin Scattering in Monomode Optical Fiber", *Journal of Optical Communications*, vol. 4, 1983, pp. 10–19.
Tsubokawa and Sasaki, "Coherent FSK Transmission Experiment Using Brillouin Amplification in a Single–Mode Fiber", *Journal of Optical Communications*, vol. 10, 1989, pp. 42–47.

Primary Examiner—Frank Gonzalez
Attorney, Agent, or Firm—V. D. Duraiswamy; W. K. Denson-Low

[57] ABSTRACT

An optical beam is made closer to diffraction limited by coupling it into a multi-mode guide, such as an optical fiber, of sufficient length to generate a stimulated Brillouin scattering (SBS) return beam with improved divergence. For this purpose the term $\Delta kL$ is made substantially greater than $\pi$, where $\Delta k$ is the difference in propagation vectors between the input and SBS beams, and L is the mutual interaction length of the input and SBS beams within the fiber. Beam amplification can also be provided by coupling a plurality of low power input beams that have respective wavelengths within the fiber's SBS linewidth into the fiber so that each of the input beams transfers energy into the SBS beam, which emerges with a power greater than that of any of its inputs. The beam cleanup and amplification functions are capable of operating with continuous wave or pulsed inputs.

25 Claims, 2 Drawing Sheets

METHOD AND APPARATUS FOR OPTICAL BEAM COMBINATION AND CLEANUP USING STIMULATED SCATTERING

BACKGROUND OF THE INVENTION

1. Field of the Invention

This invention relates to optical beam processing through stimulated Brillouin scattering (SBS), and more particularly to beam combination and/or cleanup by directing one or more input beams along an extended length fiber.

2. Description of the Related Art

There is presently a need for continuous wave (CW) or long pulse lasers that are capable of producing a diffraction limited beam. A "diffraction limited" beam has minimum divergence, and is characterized by a planar wavefront and a Gaussian intensity profile. There are numerous industrial and medical applications for such beams. For example, welding lasers can benefit from a low divergence beam at the work place, since this allows for greater working distance and depth of field and thus allows for easier and less precise control of the welding equipment by the operator. Furthermore, the laser's output optics last longer when they are farther from the weld location.

At present only expensive and sensitive lasers are available to produce nearly diffraction limited beams. For example, there are presently no Nd:YAG lasers available that have diffraction limited beam divergence at high average powers. Even if a beam is nearly diffraction limited when originally generated, transmitting it through a multi-mode optical fiber will degrade its divergence and require a subsequent beam "cleanup" operation to restore its original low divergence. Furthermore, essentially all CW lasers are limited in the average power they can produce in a diffraction limited beam by practical or physical restraints. This includes helium-neon lasers, argon-krypton ion lasers, and diode lasers. It would be desirable to combine the outputs of many such lasers into a single powerful beam. While combining two beams has been successfully performed with the use of a polarizer, it is very difficult to combine larger numbers of beams.

SBS oscillators have been employed in the past to convert beams with poor divergence into more highly diffraction limited beams. When any material is penetrated by light with an intensity great enough to compete with the atomic forces that bind the material together, both the material and the light penetrating it are modified. This nonlinear interaction generates SBS time-reversed waves. With SBS the modified material generates sound waves that serve as reflective surfaces to produce the time-reversed waves. According to the Brillouin effect, a doublet is produced upon the scattering of monochromatic radiation, with the frequency of each of the two doublet lines differing from the frequency of the original input line by the same amount, with one line having a higher frequency and the other a lower frequency. SBS oscillators are a form of laser in which one beam is pumped by another to stimulate an oscillation between opposed mirrors. SBS oscillators are discussed, for example, in E. B. Aleksandrov, et al. "Stimulated Raman and Brillouin Scattering in Selective Resonators", *Soviet Physics JETP* 22, pages 986-992 (1966). Both SBS oscillator-amplifiers and stimulated Raman scattering (SRS, which has a much larger wavelength shift than SBS) have also been employed to improve beam divergence. Such devices are typically quite complex and employ SRS or SBS in bulk form.

In a related area, optical phase conjugation has been reported in short fiber waveguides, e.g., Serebryakov and Chertkov, "Wavefront Reversal of Microsecond Radiation in Fiber Waveguides", *Soviet Journal of Quantum Electronics*, vol. 17, 1987, pages 493-495. It has been considered important that the process be phase matched, or in other words that $\Delta kL$ be less than $\pi$, where $\Delta k$ is the difference in the propagation vectors of the relevant beams and L is the mutual interaction length of the input and return beams within the waveguide. This encourages the converted beam to be a phase conjugate of the pump beam if the device is an oscillator, or guarantees that the phase of the seed beam is imprinted upon the converted beam if the device is an amplifier. With the short fiber devices it is necessary to use higher peak power, pulsed lasers to operate sufficiently above the SBS threshold.

SBS has also been demonstrated in longer optical fibers, in which $\Delta kL$ is substantially greater than $\pi$, since 1972; Ippen and Stolen, "Stimulated Brillouin Scattering in Optical Fibers", *Applied Physics Letters*, vol. 21, 1972, pages 539-541. Developments in this area through 1982 were reviewed by Cotter, "Stimulated Brillouin Scattering in Monomode Optical Fiber", *Journal of Optical Communications*, vol. 4, 1983, pages 10-19. Since then SBS has found use in optical amplification, although limited because of its restricted bandwidth; Tsubokawa and Sasaki, "Coherent FSK Transmission Experiment Using Brillouin Amplification in a Single-Mode Fiber", *Journal of Optical Communications*, vol. 10, 1989, pages 42-47. All of these investigations employed single-mode fibers, with a single-mode input beam propagated along the fiber and stimulating a single-mode return SBS beam. They have not been found to be useful in improving beam divergence.

SUMMARY OF THE INVENTION

The present invention seeks to provide a method and apparatus that are capable of reducing optical beam divergence ("beam cleanup") to obtain a close to or nearly diffraction limited beam, and of combining multiple beams into a single powerful diffraction limited beam, and of doing so in a CW or long pulse mode of operation.

These goals are accomplished with an elongated beam guiding means, preferably an optical fiber, in which $\Delta kL$ is substantially greater than $\pi$. In contrast to prior long fiber mechanisms, the beam guiding mechanism of the present invention has a normalized frequency, a fiber parameter known in the art, that is large enough to support multi-mode propagation of the input beam. Under these conditions, a non-diffraction limited input beam can stimulate a return beam through a stimulated scattering process, preferably SBS, that is essentially diffraction limited. Multiple input beams can be coupled into the fiber over substantially its entire acceptance angle range, with the input beam energies combined into a single powerful output beam in a highly efficient energy transfer operation. Whereas the input beams undergo multi-mode propagation through the fiber, the output SBS beam is substantially single mode.

These and other feature and advantages of the invention will be apparent to one skilled in the art from the

DETAILED DESCRIPTION OF THE INVENTION

Contrary to past experience in which beam divergence has been degraded by transmission down a multi-mode fiber, the present invention uses transmission along a lengthy multi-mode fiber or other optical guiding means to produce a highly diffraction limited beam. One or more input beams that have poor divergence qualities may be used as sources for the diffraction limited output. It has been discovered that, when a divergent beam is transmitted along an optical fiber and the beam power and fiber length are great enough to exceed the SBS threshold, a return single-mode SBS beam will be produced that is closer to being diffraction limited that the input beam. Efficient transfers of energy from the input to the SBS beam have been demonstrated, allowing systems based upon this method to be used for practical beam cleanup and amplification.

Figure 1:
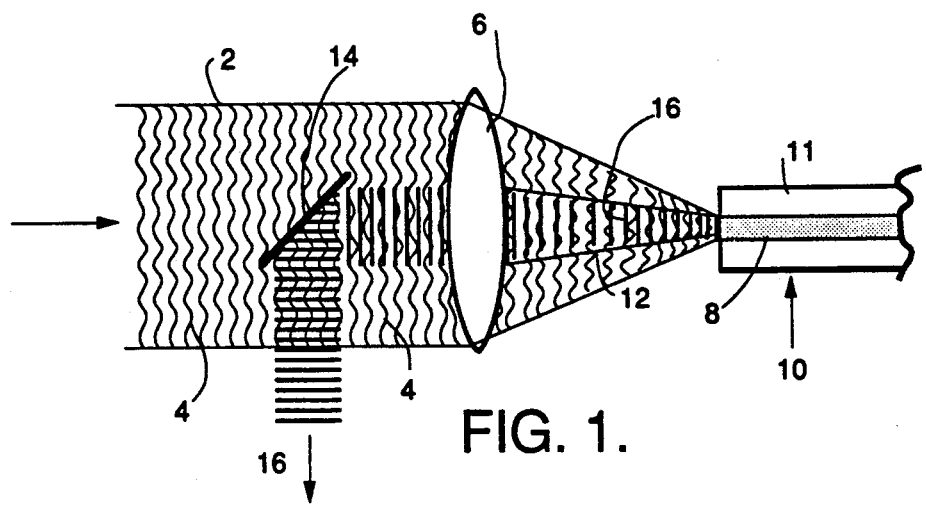
FIG. 1 is a schematic drawing of the invention employed to reduce the divergence of an input non-diffraction limited beam.

A simple single-beam system that utilizes the invention is illustrated in FIG. 1. A non-diffraction limited input beam 2 with an aberrated wavefront 4 is focused by a lens 6 onto the core section 8 of an elongate beam guiding device, such as optical fiber 10. The core is typically formed from glass or fused silica. A cladding layer 11 of slightly lower refractive index is formed around the core to confine the beam to the core. The core and/or cladding layer can be doped in a conventional manner to yield the refractive index differential. Other optical guiding devices can also be used, such as capilaries filled with a liquid SBS medium.

The normalized frequency of the fiber core 8 is selected so that, at the wavelength $\lambda$ of the input beam 2, there is a multi-transverse mode transmission of the beam through the fiber. The fiber is long enough to exceed the SBS threshold, resulting in the generation of a return SBS beam 12 that is emitted from the input end of the fiber. The SBS beam is collimated by lens 6 and segregated from the input beam by an appropriate device such as mirror 14. Numerous other methods are available to segregate the SBS beam from the input beam, such as reflecting the input beam off a mirror and onto the fiber core and drilling an appropriately sized hole in the mirror to allow the SBS beam to escape.

Surprisingly, with a multi-transverse mode input beam 2 the return SBS beam 12 has been found to be substantially single mode, with a substantially planar wavefront 16. As such, it is essentially diffraction limited and has a near minimal divergence. This phenomenon has been observed for both graded-index fibers (fibers in which the refractive index is progressively reduced as the distance from the center of the core increases) and for step-index fibers (fibers in which there is an abrupt transition in refractive index between the core and the cladding layer). Currently available literature does not appear to discuss the Brillouin shift as a function of mode number for multi-mode situations, and does not appear to provide an explanation for this phenomenon.

A possible (unconfirmed) explanation may be postulated for the limiting case of a large graded index fiber, in which ray tracing instead of modal analysis can be used. A ray transmitted directly down the center of the core will see only one index of refraction. Another ray that follows a sinusoidal path around the center of the core reaches the opposite end of the fiber at the same time as the central ray, as is well known, but its propagation vector changes in both direction and magnitude as it propagates down the guide. If the sinusoidal ray undergoes SBS, the Brillouin shift would be different in different parts of its path. For example, when the ray is furthest from the center the local wavelength of the light in the medium is longer than for the central ray. The generated acoustic waves will match this wavelength, and therefore the Brillouin shift will be different than for the central ray. A mode that is predominantly off-center from the fiber core will thus see a gradient of index, whereas the mode in the center encounters a more uniform index. This may broaden the Brillouin linewidth, making it more difficult for the higher modes to exceed the SBS threshold.

In addition, SBS by each of the modes may be expected to produce different Brillouin shifts because the different modes encounter different average glass densities in the different parts of the fiber in which they travel. The modes are orthogonal, with each one propagating in a part of the fiber in which its intensity is highest. Different parts of the fiber can be expected to have different sound speeds because they have different densities and other properties. This is a result of altering the core composition, such as by doping it with germanium, to produce different refractive indexes at different distances from the fiber center. This again may make it more difficult for the higher order modes to rise above the SBS threshold.

No improvement in beam divergence is observed unless the fiber is multi-mode with respect to the input beam. A solution of Maxwell's equations for a fiber shows the light propagation to be restricted to a finite number of modes. Each mode has a different propagation constant, which must have a value between $n_1\lambda/c$ and $n_2\lambda/c$, where $n_1$ and $n_2$ represent the upper and lower limits of the refractive index range for the guide material, $\lambda$ is the beam frequency, and c is the speed of light.

The number of modes that can propagate in a given fiber for large value of normalized frequency (the so called V-number) can be approximated simply by $V^2/2$ for a step index fiber and $V^2/4$ for a graded index fiber. The V-number is defined as:

$$V = 2\pi a NA/\lambda,$$

where a is the radius of the fiber core, NA is the fiber's numerical aperture (the angular range over which it can accept input beams), and $\lambda$ is the input beam wavelength. For a step-index fiber, $NA = (n_1^2 - n_2^2)^{\frac{1}{2}}$, where $n_1$ and $n_2$ are the refractive indexes of the core and cladding, respectively. If V is less than 2.4, there is only one propagating mode (with 2 possible polarizations).

Figure 2:
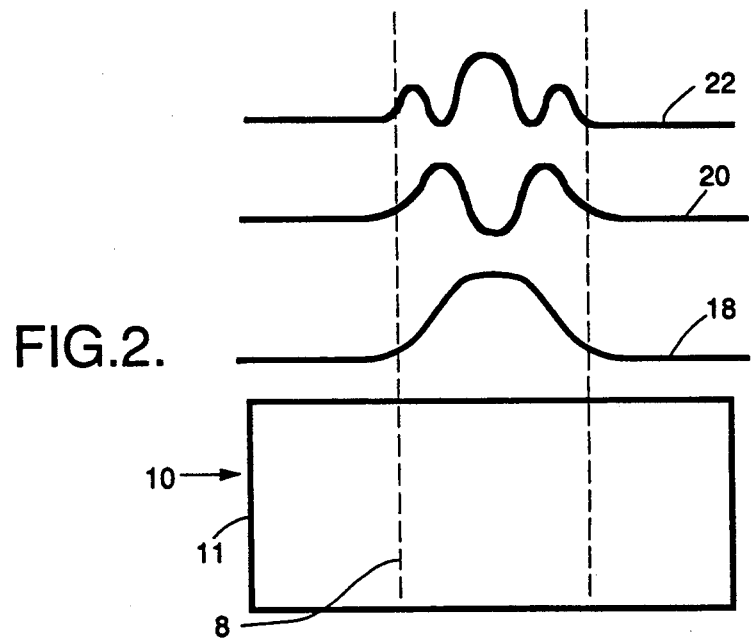
FIG. 2 is an illustration of multiple transverse optical modes of propagation through a fiber.

Transverse modes of propagation can be visualized as illustrated in FIG. 2. The lowest order mode will assume an intensity profile such as that indicated by trace 18, with a peak at the center of the core and diminishing along a Gaussian curve to minimal values in the cladding layer. The second order mode (trace 20) has peaks offset from the core center, with a minimum value at the center; the third order mode (trace 22) has peaks both at the core center and offset therefrom. The number of modes generated in experimental demonstrations of the invention range from 5 to about 50, but in practice this can be increased to thousands of modes.

The optical fiber or other guide through which the input beam is directed must be long enough for an SBS beam to be generated. This is contrary to conventional optical transmission through a fiber in which it has been considered important that the process be phase matched, i.e., that $\Delta kL$ be less than $\pi$. With the present invention, $\Delta kL$ should be substantially greater than $\pi$ and preferably greater than about $10\pi$. If $\Delta kL$ is equal to $\pi$, phase conjugation of the SBS return can be expected. The particular length for any given application will depend upon the optical properties of the guide medium, the input beam power and the desired conversion efficiency to the SBS beam. While an experimental demonstration of the invention used fiber lengths of about 3 km, the invention could also be successfully implemented in most cases with fiber lengths in the hundreds of meters.

Figure 3:
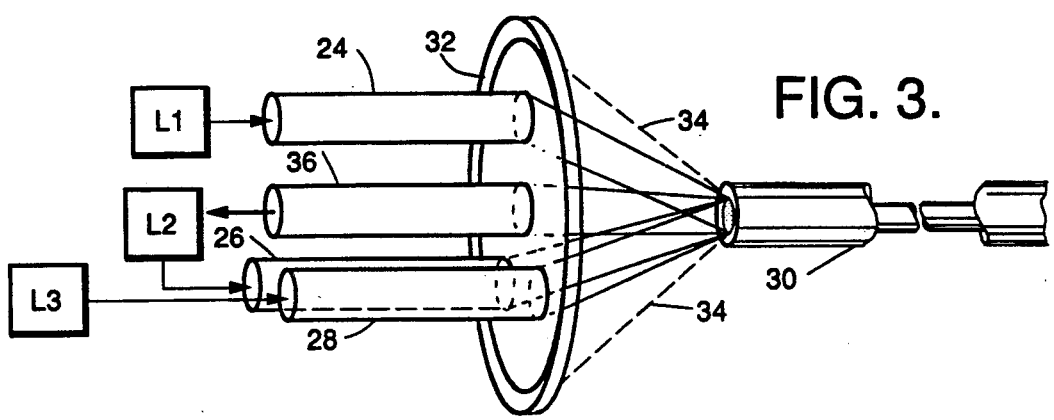
FIG. 3 is a illustrative perspective view of the invention employed to combine multiple input beams into an amplified output beam that is more highly diffraction limited than the input beams.

The invention can also be used as an amplifier that combines multiple low power input beams into an output beam that is more powerful than any single one of the inputs, and is also closer to being diffraction limited. This application is illustrated in FIG. 3. In this example three input beams 24, 26 and 28 from respective lasers L1, L2 and L3 are combined in an elongate optical fiber 30. The beams are coupled into the fiber in a conventional manner, such as with a coupling lens 32; a lens with a 12-14.4 mm focal length microscope objective was used to focus the input beams into the core of a 0.015 mm diameter fiber. The diameters of the beams relative to the coupling lens (which had an 8 mm aperture) is shown approximately to scale. Each beam's diameter and the coupling lens' focal length were selected so that the sizes of the focused beam spots were just smaller than the size of the fiber core; this is known as an optimal coupling geometry. Since the focused spot size decreases as the size of the beam and its diffraction limited quality at the coupling lens increase, the diameter of the fiber core could have been made smaller if the input beam sizes and/or their diffraction limited quality had been increased. Taking this one step further, input beams with greater divergences can be accommodated and coupled into the fiber core by making their cross-sectional areas greater at the coupling lens. The only limitation in the area over which the input beams can be spread is that it should not exceed the fiber's numerical aperture, indicated by dashed lines 34.

Even with all of the input beams multi-mode, a return SBS beam 36 that is back-scattered from the fiber emerges as a nearly single-mode beam at the lowest fiber modes, and over a much smaller angle than the fiber's full numerical aperture.

The permissible input beam wavelengths depend upon the input beam powers. If the power of each individual input beam is greater than the power threshold for SBS within the fiber, each input beam can have a different wavelength that is significantly separated from the other. If, however, the input beams exceed the SBS threshold only when their powers are combined but not when they are taken individually, then their individual wavelengths must all be within the bandwidth of the non-linear SBS effect within the fiber for them to combine their energies into a single higher energy output SBS beam. A particular Brillouin linewidth is inherent for each core material; it is typically about 50 MHz for glass. The input beams will not couple into a combined SBS beam unless the difference between their respective wavelengths is less than the Brillouin linewidth for the particular core material.

Figure 4:
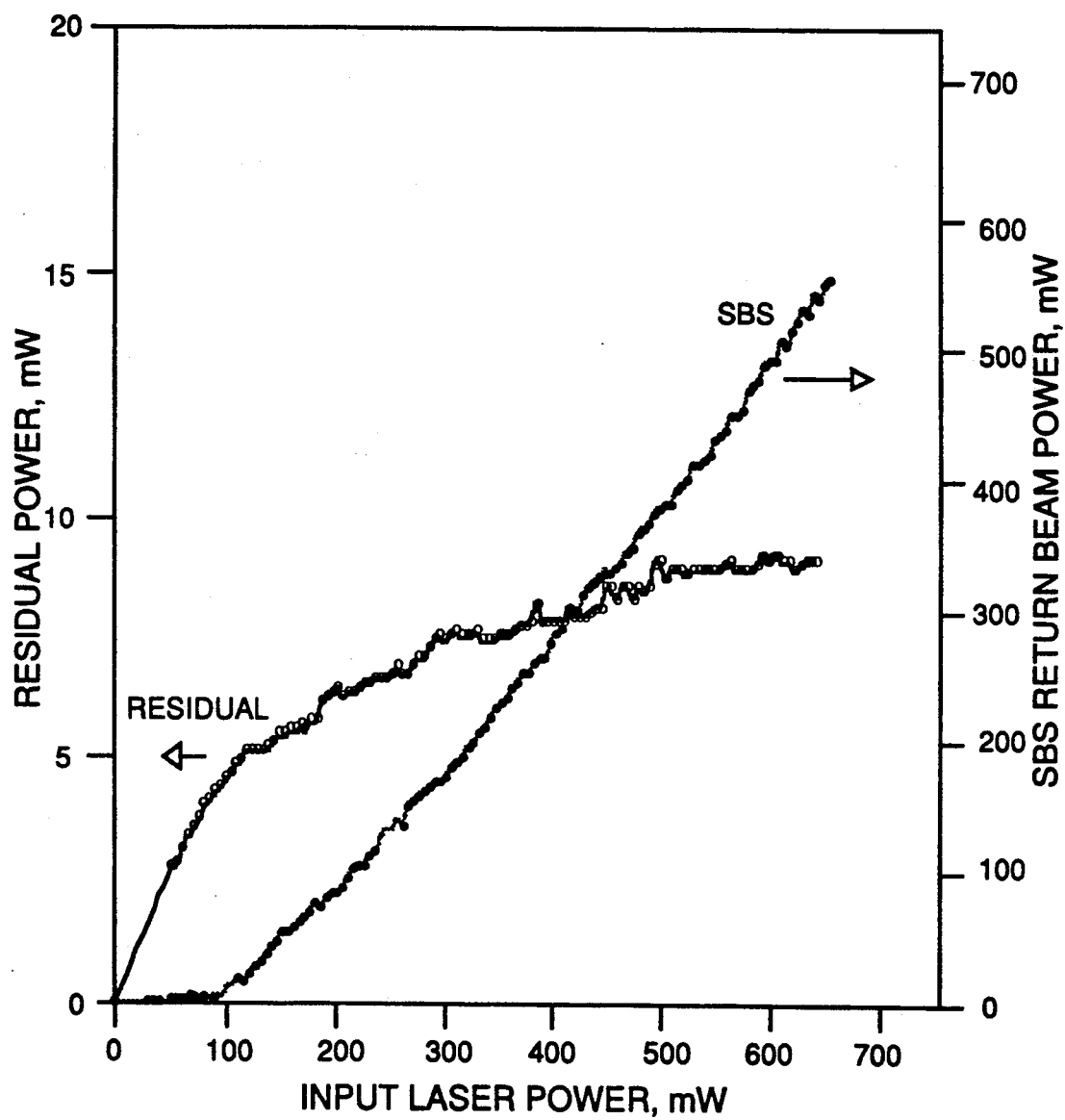
FIG. 4 is a graph plotting the power of the SBS return beam and of the residual input beam power, against the original input beam power, in accordance with the invention.

In a demonstration of the invention, a Krypton ion laser was used as the input beam source to direct a 752 mm beam into a graded-index fiber, and a 647 mm beam into a step-index fiber. A 12 mm focal length, 0.25 numerical aperture microscope objective was used to couple the beam into the graded-index fiber, while a 14.5 mm focal length lens was used to couple the beam into the step-index fiber. After accounting for insertion losses, Fresnel losses associated with the fiber cleave and reflection losses, the fiber was found to have a conversion efficiency to the SBS beam of 87% for the graded-index fiber, and 83% for the step-index fiber. Various fibers were used, with core diameters ranging from 5 to 16 microns. The returned SBS beam was found to have essentially diffraction limited beam divergence. This occurred regardless of how the input beam was launched into the fiber or how much its phase front was aberrated, so long as it could be coupled into the fiber. The SBS beam divergence remain constant as the input power was raised to ten times the SBS threshold, at which over 0.65 watts (limited by the available laser) at 752 mm was converted at 87% efficiency. A graded-index fiber with a 16 micron core ($V=14$), into which a 7 times diffraction limited beam could be launched, was used. Good coupling was maintained over the fiber's full numerical aperture. The powers of the typical SBS return beam, and also of the residual input beam that was not converted to the SBS beam, are plotted as a function of the input laser power in FIG. 4; power scales for the SBS beam and residual input beam are given on the right and left hand vertical axes, respectively.

The SBS beam that emerged from the optical fiber was in only the lowest fiber modes, even when the pump laser was launched into higher fiber modes. The SBS beam thus had considerably better beam divergence qualities than the pump beam. For the graded-index multi-mode fiber, the SBS output was essentially a diffraction limited beam, whereas the input power launched into the fiber was as much as 7 times diffraction limited. The input beam was operated CW.

Straightforward applications of the invention are in improving the brightness of a laser that has a poor beam divergence, such as a CW Nd:YAG laser, and in optical amplification through the combination of multiple lower power beams. Two limitations of the invention are that the input laser must be operated in a single longitudinal mode or at least that every higher longitudinal mode be sufficiently above the SBS threshold that conversion efficiency is satisfactory, and that on the average the return SBS beam is spectrally broadened and has large amplitude fluctuations (although when averaged over a period of one second the amplitude appears fairly constant). The invention has a considerable potential for the commercial manufacture of CW lasers, since it provides a relatively inexpensive way to improve the performance of an existing laser.

While several illustrative embodiments of the invention have been shown and described, numerous variations and alternate embodiments will occur to those skilled in the art. For example, while the invention permits the use of CW inputs, it will also work with pulsed lasers. Furthermore, it may also work with non-SBS stimulated scattering processes, such as stimulated Raman scattering (SRS). Such variations and alternate embodiments are contemplated, and can be made without departing from the spirit and scope of the invention as defined in appended claims.

I claim:

1. An optical beam processing system for producing a diffraction limited output beam, comprising:
    a beam source for providing a divergent input optical beam,
    an elongate beam guiding means, and
    means for coupling said input optical beam from said beam source into said beam guiding means,
    said beam guiding means having a normalized frequency value large enough to support substantially multi-mode propagation of said input optical beam, and a length which is long enough to generate a diffraction limited return beam which is substantially more diffraction limited than said input optical beam through stimulated scattering in response to said input optical beam being coupled into said beam guiding means, said diffraction limited return beam exiting said beam guiding means as said diffraction limited output beam.

2. The system of claim 1, wherein said stimulated scattering comprises stimulated Brillouin scattering (SBS).

3. The system of claim 1, said beam source providing a plurality of input optical beams, said coupling means coupling each of said input beams into said beam guiding means, said beam guiding means combining a substantial portion of the powers of said input beams into said return beam.

4. The system of claim 3, wherein said input beams are substantially non-diffraction limited, and said return beam is substantially more diffraction limited than any of said input beams.

5. The system of claim 1, wherein $\Delta kL$ is substantially greater than $\pi$, where $\Delta k$ is the difference in propagation vectors between said input beam and said return beam in said beam guiding means, and L is the mutual interaction length of said input beams within said beam guiding means.

6. The system of claim 5, wherein $\Delta kL$ is greater than about $10\pi$.

7. The system of claim 1, said beam guiding means comprising an optical fiber having a core surrounded by a cladding layer, said core and cladding layer being selected to have a refractive index differential that substantially restricts said input beam to said core.

8. The system of claim 7, said optical fiber having a graded transition between said core and said cladding layer.

9. The system of claim 7, said optical fiber having an abrupt transition between said core and said cladding layer.

10. The system of claim 1, wherein said input beam is substantially non-diffraction limited, and said return beam is substantially closer to diffraction limited than said input beam.

11. The system of claim 1, wherein said beam source provides said input optical beam as a continuous wave beam.

12. The system of claim 1, said beam guiding means comprising a capillary filled with a liquid SBS medium.

13. An optical beam processing system for producing a diffraction limited output beam, comprising:
    a beam source for providing a divergent input optical beam,
    an elongate beam guiding means, and
    means for coupling said input optical beam from said beam source into said beam guiding means,
    said beam guiding means having guiding parameters capable of supporting substantially multi-mode propagation of said input optical beam, and a length which is long enough to generate a diffraction limited return beam which is substantially more diffraction limited than said input optical beam through stimulated scattering in response to said input optical beam being coupled into said beam guiding means, wherein said stimulated scattering comprises stimulated Brillouin scattering (SBS), and
    wherein said input optical beams are individually low power beams below the SBS threshold of said guiding means but have an aggregate power greater than said SBS threshold, and said input optical beams have respective wavelengths within the SBS linewidth of said beam guiding means.

14. A method of producing a diffraction limited output beam in response to a non-diffraction limited source optical beam, comprising:
    directing said source beam in a multi-mode propagation through an optical guide for a sufficient distance to generate a return beam within said optical guide through stimulated scattering, and
    coupling out said return beam as said diffraction limited output beam.

15. The method of claim 14, wherein said return beam is generated through stimulated Brillouin scattering (SBS).

16. The method of claim 14, wherein said source beam is a continuous wave beam.

17. The method of claim 14, wherein said source beam is propagated through an optical guide that comprises an optical fiber core surrounded by a cladding material.

18. A method of combining a plurality of input optical beams into an output beam, comprising:
    directing said input optical beams together in a multi-mode propagation through a beam guiding medium at least long enough to generate a return stimulated scattering beam within said beam guiding medium, energy being transferred from said input optical beams to said return stimulated scattering beam through a stimulated scattering process, and
    coupling out said return stimulated scattering beam as said output beam.

19. The method of claim 18, wherein said return beam is generated through stimulated Brillouin scattering (SBS).

20. The method of claim 19, wherein said input beams are individually low power beams below the SBS threshold of said beam guiding medium but have an aggregate power greater than said SBS threshold, said input beams having respective wavelengths within the SBS linewidth of said beam guiding medium.

21. The method of claim 18, wherein said input beams are substantially non-diffraction limited, and said return beam is substantially more diffraction limited than any of said input beams.

22. The method of claim 18, wherein $\Delta kL$ is substantially greater than $\pi$, where $\Delta k$ is the difference in propagation vectors between said input beams and said return beam in said beam guiding medium, and L is the mutual interaction length of said input beams within said beam guiding means.

23. The method of claim 22, wherein $\Delta kL$ is greater than about $10\pi$.

24. The method of claim 18, wherein said input beams are continuous wave beams.

25. The method of claim 18, wherein said input beams are propagated through a beam guiding medium that comprises an optical fiber core surrounded by a cladding material.

* * * * *